(12) United States Patent
Wu et al.

(10) Patent No.: US 12,120,057 B2
(45) Date of Patent: Oct. 15, 2024

(54) ON-DEMAND REFERENCE SIGNALS FOR LOCATION RELATED MEASUREMENTS

(71) Applicant: Apple Inc., Cupertino, CA (US)

(72) Inventors: Zhibin Wu, Los Altos, CA (US); Dawei Zhang, Saratoga, CA (US); Haijing Hu, Los Gatos, CA (US); Jie Cui, San Jose, CA (US); Seyed Ali Akbar Fakoorian, San Diego, CA (US)

(73) Assignee: Apple Inc., Cupertino, CA (US)

( * ) Notice: Subject to any disclaimer, the term of this patent is extended or adjusted under 35 U.S.C. 154(b) by 226 days.

(21) Appl. No.: 17/669,915

(22) Filed: Feb. 11, 2022

(65) Prior Publication Data

US 2022/0321300 A1    Oct. 6, 2022

Related U.S. Application Data

(60) Provisional application No. 63/168,874, filed on Mar. 31, 2021.

(51) Int. Cl.
*H04W 64/00* (2009.01)
*H04L 5/00* (2006.01)

(52) U.S. Cl.
CPC .......... *H04L 5/0051* (2013.01); *H04L 5/0042* (2013.01); *H04W 64/006* (2013.01)

(58) Field of Classification Search
CPC ..... H04L 5/0042; H04L 5/0048; H04L 5/005; H04L 5/0051; H04L 5/0053; H04W 64/00;

(Continued)

(56) References Cited

U.S. PATENT DOCUMENTS 9,294,875 B2   3/2016  Ahn et al.
2016/0337805 A1 11/2016  Liao et al.
(Continued)

FOREIGN PATENT DOCUMENTS

CN   106507471 A   3/2017
CN   110166501 A   8/2019
(Continued)

OTHER PUBLICATIONS

Korean Office Action directed to Korean Appl. No. 10-2022-0030130, dated May 22, 2024, 18 pages.
(Continued)

*Primary Examiner* — Siu M Lee
(74) *Attorney, Agent, or Firm* — Sterne, Kessler, Goldstein & Fox P.L.L.C.

(57) ABSTRACT

Some aspects of this disclosure relate to apparatuses and methods for implementing techniques for providing a user equipment (UE) with on-demand reference signals for location related measurements of the UE. The UE can receive location assistance data from a network server, where the location assistance data includes information about a plurality of downlink reference signals that can be used to perform location related measurements by the UE. The UE can send a request to a base station for a reference signal. The reference signal is selected from the plurality of downlink reference signals of the location assistance data. Furthermore, the UE can receive the reference signal from the base station, and perform a location related measurement based on the received reference signal.

14 Claims, 5 Drawing Sheets

(58) Field of Classification Search
CPC .... H04W 64/006; H04W 24/10; Y02D 30/70; G01S 5/0045; G01S 11/06; G01S 2205/008; H04B 17/309
See application file for complete search history.

(56) References Cited

U.S. PATENT DOCUMENTS

| | | | |
|---|---|---|---|
| 2019/0302220 A1 | 10/2019 | Kumar et al. | |
| 2020/0028648 A1 | 1/2020 | Akkarakaran et al. | |
| 2020/0137715 A1 | 4/2020 | Edge et al. | |
| 2020/0296680 A1 | 9/2020 | Akkarakaran et al. | |
| 2020/0374658 A1 | 11/2020 | Chang | |
| 2021/0328747 A1* | 10/2021 | Da | H04L 5/0058 |
| 2022/0022158 A1* | 1/2022 | Zarifi | H04L 5/0048 |
| 2022/0124664 A1 | 4/2022 | Cha et al. | |
| 2022/0150866 A1* | 5/2022 | Ren | H04L 5/0048 |
| 2022/0173857 A1* | 6/2022 | Michalopoulos | G01S 5/0236 |
| 2023/0224738 A1* | 7/2023 | Yerramalli | H04W 64/006 370/252 |
| 2023/0296718 A1* | 9/2023 | Kumar | G01S 5/0036 455/456.1 |

FOREIGN PATENT DOCUMENTS

| | | |
|---|---|---|
| CN | 111356075 A | 6/2020 |
| CN | 111919132 A | 11/2020 |
| KR | 20200135271 A | 12/2020 |
| KR | 20210025058 A | 3/2021 |
| TW | 2020-27545 A | 7/2020 |

OTHER PUBLICATIONS

Chinese Office Action directed to Chinese Patent Application No. 202210235911.7, mailed Aug. 9, 2024; 25 pages.

* cited by examiner

ON-DEMAND REFERENCE SIGNALS FOR LOCATION RELATED MEASUREMENTS

RELATED APPLICATION

This application claims the benefit of U.S. Provisional Application No. 63/168,874, filed Mar. 31, 2021, which is incorporated by reference herein in its entirety.

BACKGROUND

Field

The described aspects generally relate to on-demand reference signals for location related measurements.

Related Art

The location of a user equipment (UE) or a mobile device in a wireless network or system can be useful for many applications such as, emergency calls, personal navigation, asset tracking, locating a friend or family member, and more. New wireless networks can provide positioning accuracy to a meter and below. However, measuring and reporting parameters for identifying a location of a UE can consume a large amount of device and network resources, e.g., bandwidth. Solutions are desired to reduce resource usage while improving efficiency for measuring and reporting parameters for identifying a location of a UE in a wireless network or system.

SUMMARY

Some aspects of this disclosure relate to apparatuses and methods for implementing techniques for providing a user equipment (UE) with on-demand reference signals for location related measurements of the UE. The implemented techniques can be applicable to many wireless systems, e.g., a wireless communication system based on 3rd Generation Partnership Project (3GPP) release 15 (Rel-15), release 16 (Rel-16), release 17 (Rel-17), or others.

Some aspects of this disclosure relate to a UE. The UE can include a transceiver configured to enable wireless communication with a base station, and a processor communicatively coupled to the transceiver. The processor of the UE is configured to receive location assistance data from a network server that manages location functions. The location assistance data can be received according to a first location related protocol between the UE and the network server, and can include information about a plurality of downlink reference signals that can be used to perform location related measurements by the UE. The first location related protocol is different from a second location related protocol that is used by the network server to configure the base station. The processor is further configured to send, using the transceiver a request for a reference signal. In embodiments, a reference signal from a base station is used as an example. In reality, the request can be for multiple reference signals from multiple base stations. The reference signal is selected from the plurality of downlink reference signals of the location assistance data. Furthermore, the processor is configured to receive the reference signal from the base station, and perform a location related measurement based on the received reference signal. In some examples, the processor is further configured to receive from the network server a request for the location related measurement to be provided by the UE, and report the location related measurement to the network server, both according to the first location related protocol.

In some examples, to send the request for the reference signal, the processor can be configured to select one or more reference signals from the plurality of downlink reference signals of the location assistance data, and request the selected one or more reference signals from the base station. The processor can be configured to send to the base station the request for the reference signal by radio resource control (RRC) signaling, medium access control-control element (MAC-CE) signaling, or layer 1 (L1) signaling. In some other examples, the processor is further configured to select one or more reference signals from the plurality of downlink reference signals of the location assistance data, and send an indication of request to the network server about the selected one or more reference signals. Afterwards, the processor is configured to receive the reference signal from the base station, where the received reference signal is among the selected one or more reference signals.

In some examples, the reference signal comprises a positioning reference signal (PRS). The first location related protocol between the UE and the network server can be LTE positioning protocol (LPP). The second location related protocol between the network server and the base station can be new radio positioning protocol A (NRPPa) or LTE positional protocol A (LPPa). The wireless access protocol can be a Fifth Generation (5G) protocol, a New Radio (NR) protocol, or a Long Term Evolution (LTE) protocol. The location related measurement can include one or more of a received signal strength indication (RSSI), a round trip signal propagation time (RTT), a reference signal time difference (RSTD), a reference signal received power (RSRP), a reference signal received quality (RSRQ), an angle of arrival (AOA), or an angle of departure (AOD).

In some examples, the location assistance data can include assistance data to support one or more of position procedures including: Observed Time Difference Of Arrival (OTDOA), Downlink time difference of arrival (DL-TDOA), Downlink angle-of-departure (DL-AoD), multi-cell round trip time (multi-RTT), Assisted Global Navigation Satellite System (A-GNSS), Real Time Kinematics (RTK), Precise Point Positioning (PPP), or Differential GNSS (DGNSS). The plurality of downlink reference signals of the location assistance data can include all reference signals the UE can use to perform the location related measurement. A downlink reference signal of the plurality of downlink reference signals of the location assistance data can include various flags, e.g., a first flag to indicate whether the reference signal is currently being transmitted by the base station, a second flag to indicate whether the reference signal can be dynamically triggered, a third flag to indicate whether the reference signal can be dynamically triggered by the first location related protocol, or a fourth flag to indicate whether the reference signal can be dynamically triggered by the wireless access protocol. The information about the plurality of downlink reference signals of the location assistance data includes an identifier associated with a downlink reference signal of the plurality of downlink reference signals, and a transmission configuration of the base station associated with the downlink reference signal.

Some aspects of this disclosure relate to a method performed by a network server managing location functions. The method includes sending to a base station a configuration for location related measurement according to a first location related protocol (e.g, NRPPa or LPPa), and sending to a UE location assistance data. The location assistance data can be sent to the UE according to a second location related protocol (e.g., LPP) between the network server and the UE, and can include information about a plurality of downlink reference signals that can be used to perform location related measurements by the UE. The method can further include receiving, from the UE, a location related measurement according to the second location related protocol. The location related measurement is obtained based on a reference signal selected from the plurality of downlink reference signals of the location assistance data.

Some aspects of this disclosure relate to non-transitory computer-readable medium storing instructions. When executed by a processor of a UE, the instructions stored in the non-transitory computer-readable medium cause the UE to perform various operations. The operations include receiving, according to a first location related protocol, location assistance data from a network server that manages location functions. The location assistance data can include information about a plurality of downlink reference signals that can be used to perform location related measurements by the UE. The first location related protocol is different from a second location related protocol that is used by the network server to configure a base station. The operations further include sending a request for a reference signal. The reference signal is selected from the plurality of downlink reference signals of the location assistance data. In addition, the operations include receiving the reference signal from the base station, performing a location related measurement based on the received reference signal, and reporting the location related measurement to the network server according to the first location related protocol.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
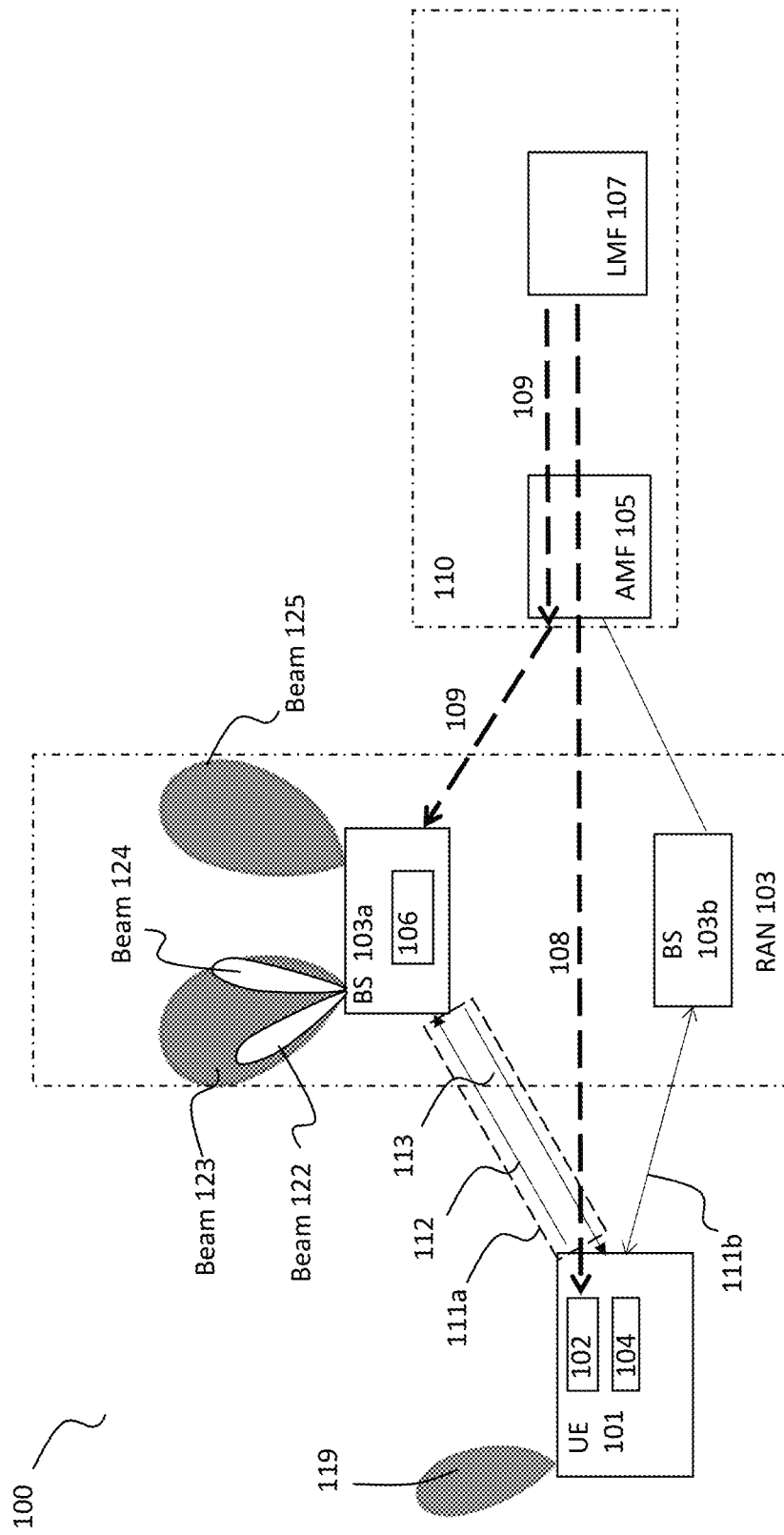
FIG. 1 illustrates a wireless communication system including a user equipment (UE), multiple base stations, coupled to a network server of a core network to provide on-demand reference signals for location related measurements of the UE, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Embodiments herein present example solutions for providing on-demand reference signals for location related measurements of a user equipment (UE) in a wireless system, e.g., a fifth generation (5G) system, a New Radio (NR) system, a long term evolution (LTE) system, a combination thereof, or some other wireless systems. The location of a UE can be determined in various ways, e.g., UE-assisted or UE-based. In a UE-assisted location determination scheme, a UE can report location related measurements to a network server that manages location functions, e.g., a location management function (LMF), where the network server can calculate the UE location. On the other hand, in a UE-based location determination scheme, UE can calculate the UE location based on the location related measurements performed by the UE, without reporting such location related measurements to the network server. Mechanisms described herein are applicable to both UE-assisted and UE-based location determination of the UE. In some examples, operations may be described with respect to UE-assisted location determination scheme. Such operations can be easily adapted by those skilled in the art to be applicable to UE-based location determination scheme.

In a wireless system, a UE can perform location related measurements based on a current reference signal received from a base station, using configurations and information provided in location assistance data that is sent to the UE from a network server. Conventionally, a UE can use a downlink positioning reference signal (DL-PRS) that is always on and periodically communicated from a base station. The network server does not need to start or stop the DL-PRS. Since the DL-PRS is always on, the UE only needs to receive location assistance data associated with the DL-PRS from the network server to perform location related measurements, and report to the network server the location related measurements or the calculated location of the UE. The network server can request DL-PRS information from a base station to generate and deliver the location assistance data to the UE. However, an always-on periodic DL-PRS can consume a large amount of bandwidth resources and power for the UE and the base station.

Instead of using an always-on periodic reference signal, a UE, according to embodiments described herein, can request a reference signal from a base station, e.g., a next generation node-B (gNB), when there is a need for location related measurements. Such a reference signal can be referred to as an on-demand reference signal or a requested reference signal. When an on-demand reference signal implementation is used, the base station or the network server does not transmit the reference signal by default. Instead, when needed, the UE triggers the transmission of the reference signal by the base station. For example, the UE can trigger the reference signal transmission by the base station after receiving a provide-location request from the network server. Compared to the always-on periodic reference signals, on-demand reference signals can save network bandwidth, improve network efficiency, and also increase the accuracy of the location related measurements.

However, an on-demand reference signal based location related measurement can have a relatively long latency and low computation efficiency. Every time an on-demand reference signal is needed by the UE for a location related measurement, the network server needs to configure the base station to send the reference signal to the UE, and further send to the UE the location assistance data to be used by the UE for the location related measurement. Such a mechanism can cause repeated configurations of the base station and transmissions of the location assistance data, resulting in wasted system bandwidth with increased latency.

Embodiments herein present example solutions for providing a UE with on-demand reference signals for location related measurements of the UE. Instead of sending the location assistance data when a location related measurement is needed based on an on-demand reference signal, the network server can configure the base stations and the UE with a set of location assistance data. Such location assistance data can include information about all the possible reference signals to be used by the UE for performing location related measurements. Hence, such location assistance data only needs to be sent once, saved by the UE, and used later by the UE when there is a need to perform location related measurement. When a location related measurement is performed, the UE requests a reference signal from the base station, and performs the location related measurement or calculation of the location based on the saved location assistance data. Accordingly, embodiments herein present solutions that can reduce bandwidth as well as latency for providing a UE with on-demand reference signals for location related measurements of the UE. In some embodiments, a UE can switch off the on-demand capability and obtain the reference signals in other ways, e.g., use always-on periodic reference signals or randomly distributed reference signals.

Figure 2:
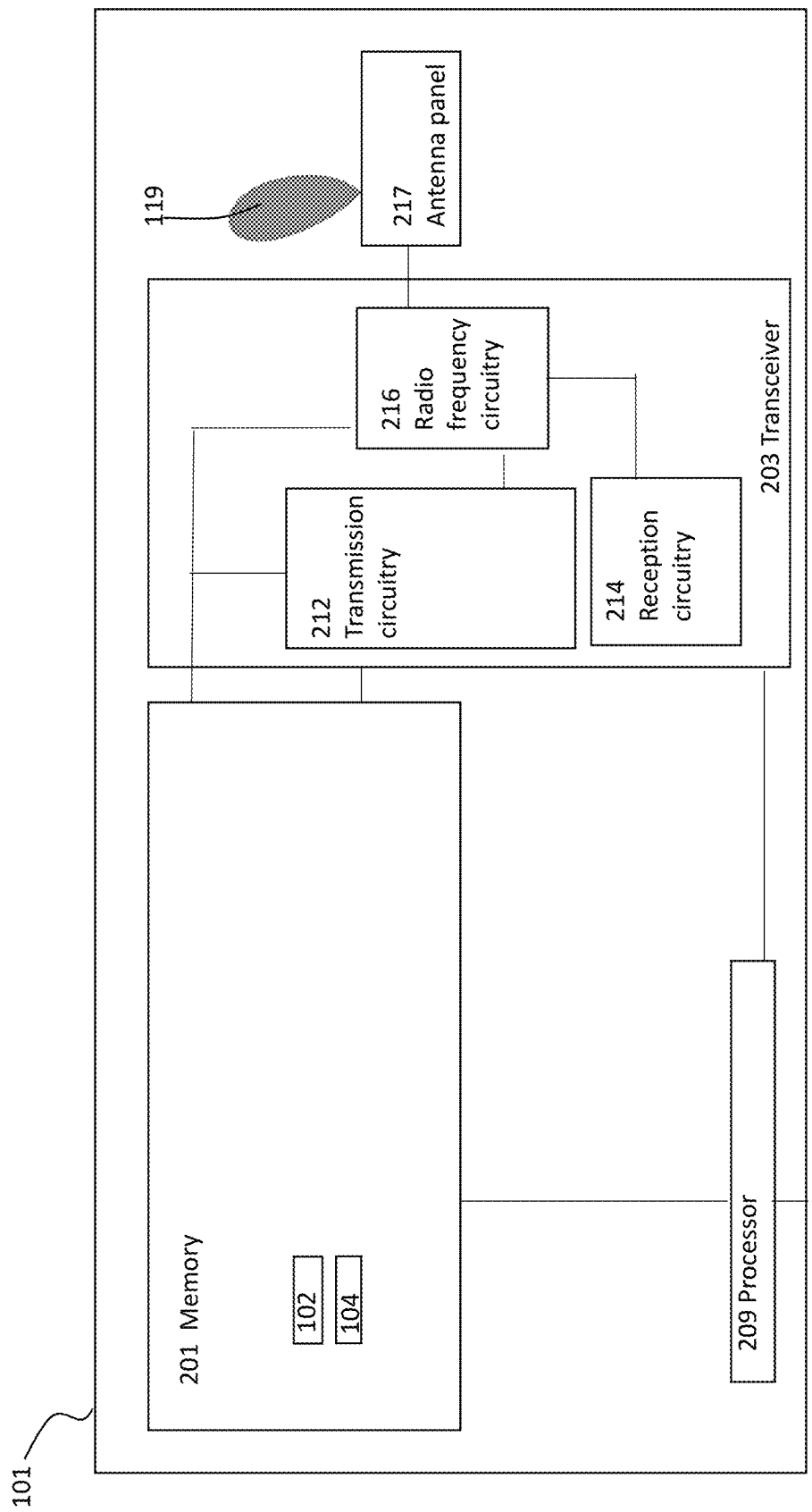
FIG. 2 illustrates a block diagram of a UE to perform functions described herein, according to some aspects of the disclosure.

FIG. 1 illustrates a wireless communication system 100 including a UE, e.g., a UE 101, multiple base stations, coupled to a network server of a core network 110 to provide on-demand reference signals for location related measurements of the UE, according to some aspects of the disclosure. FIG. 2 illustrates a block diagram of a UE, e.g., UE 101, to perform functions described herein. Wireless communication system 100 is provided for the purpose of illustration only and does not limit the disclosed aspects. Wireless communication system 100 can include, but is not limited to, UE 101, a base station (BS) 103a, a base station 103b, and a network server 105 and a network server 107 that are a part of core network 110. UE 101 communicates with base station 103a over a communication interface 111a, and communicates with base station 103b over a communication interface 111b. Base station 103a and base station 103b are a part of a radio access network (RAN) 103. Communication interface 111a and communication interface 111b can be a wireless communication interface defined by wireless access protocols, e.g., 5G protocols, NR protocols, or LTE protocols, or other wireless protocols.

In some examples, wireless communication system 100 can be a NR system, a LTE system, a 5G system, some other wireless system, or a combination thereof. Even though many examples are described herein in the context of a NR system or a LTE system, wireless communication system 100 is not limited to a NR system or a LTE system. Instead, wireless communication system 100 can be any communication system that can provide on-demand reference signals for location related measurements of the UE, or performs other functions described in this disclosure. There can be other network entities, e.g., network controller, a relay station, in wireless communication system 100 that are not shown, but will be understood by those skilled in the art. Wireless communication system 100 can support a wide range of use cases such as enhanced mobile broad band (eMBB), massive machine type communications (mMTC), ultra-reliable and low-latency communications (URLLC), and enhanced vehicle to anything communications (eV2X).

According to some aspects, UE 101 can be stationary or mobile. UE 101 can be a cellular phone (e.g., a smart phone), a personal digital assistant (PDA), a wireless modem, a wireless communication device, a handheld device, a laptop, a desktop, a cordless phone, a wireless local loop station, a tablet, a camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include, a robot, a drone, a location tag, and/or the like.

According to some aspects, base station 103a and base station 103b of RAN 103 can be a fixed station or a mobile station. Base station 103a and base station 103b can also be called other names, such as a base transceiver system (BTS), an access point (AP), a transmission/reception point (TRP), an evolved NodeB (eNB), a next generation node B or a new radio node B (gNB), a next generation evolved Node B (ng-eNB), a 5G node B (NB), or other equivalent terminology as will be understood by those skilled in art. In some examples, base station 103a and base station 103b can be interconnected to one another and/or to other base stations or network nodes in a network through various types of backhaul interfaces such as a direct physical connection, wireless connection, a virtual network, and/or the like. In some examples, base station 103a or base station 103b can function as positioning-only beacons, which may transmit signals, e.g. positioning reference signal (PRS), and/or may broadcast assistance data to assist positioning of UE 101 but may not receive signals from UE 101 or from other UEs. There can be other base stations within RAN 103, not shown.

In some examples, base station 103a can include multiple antenna beams, e.g., beam 123, and beam 125, which can be formed by multiple antenna elements. In addition, according to a configuration 106, a wide beam, e.g., beam 123, can be split into multiple narrow beams, e.g., a beam 122, and a beam 124. The various beams can be configured according to configuration 106, which may be received from network server 107. The beams can have an identifier or identified by numbers to distinguish them. For example, beam 123 and beam 125 can be identified as beam 1 and beam 2, while beam 122 and beam 124 can be identified as beam 1-1 and beam 1-2. The number of wide or narrow beams shown are examples only, and are not limiting. Base station 103b can have similar beams according to a configuration for base station 103b.

According to some aspects, base station 103a and base station 103b can be coupled to network server 105 that manages mobility for UE 101, which can be further coupled to network server 107 that manages location functions for UE 101. Network server 105 and network server 107 are shown as two separated entities of core network 110. In some examples, network server 105 and network server 107 can be implemented as one server or one entity to perform functions described herein. Network server 105 can be an access and mobility management function (AMF) supporting mobility of UE 101, including cell change and handover. Network server 105 can also participate in supporting a signaling connection for, or data and voice bearers to UE 101. Network server 107 can be location management function (LMF), location manager (LM), location function (LF), commercial LMF (CLMF), value added LMF (VLMF), or some other functions.

According to some aspects, network server 107 can receive location related measurements and assistance information from base station 103a, base station 103b, and UE 101, via network server 105. Network server 107 can support positioning of UE 101 when UE 101 accesses RAN 103. Network server 107 can support various position procedures or methods, such as Assisted Global Navigation Satellite System (A-GNSS), Observed Time Difference of Arrival (OTDOA), DL-TDOA (Downlink Time Difference Of Arrival), DL-AoD (Downlink Angle of Departure), Multi-RTT (Multiple Round-Trip Time), Real Time Kinematics (RTK), Precise Point Positioning (PPP), Differential GNSS (DGNSS), angle of arrival (AOA), angle of departure (AOD), or other positioning procedures.

According to some aspects, network server 107 can deliver location assistance data 102 to UE 101 according to a first location related protocol 108 between UE 101 and network server 107. In addition, network server 107 can configure base station 103a, by delivering configuration 106 to base station 103a, using a second location related protocol 109 between network server 107 and base station 103a. The first location related protocol 108 can be different from the second location related protocol 109. In some examples, the first location related protocol 108 can include LTE positioning protocol (LPP), or LTE positioning protocol A (LPPa), while the second location related protocol 109 can include new radio positioning protocol (NRPP), or new radio positioning protocol A (NRPPa).

According to some aspects, UE 101 can receive location assistance data 102 from network server 107 according to the first location related protocol 108. Location assistance data 102 can include assistance data to support one or more of position procedures including OTDOA, DL-TDOA, DL-AoD, Multi-RTT, A-GNSS, RTK, PPP, DGNSS, AOA, AOD, or other positioning procedures. In some examples, location assistance data 102 can include information about a plurality of downlink reference signals from BS 103a and BS 103b that can be used to perform location related measurements by UE 101. In some examples, a reference signal of the plurality of downlink reference signals of location assistance data 102 can be a positioning reference signal (PRS), a NR PRS, or some other reference signal. In some examples, a PRS can be designed to deliver high accuracy, coverage, and interference avoidance and suppression. For example, a PRS can have a large delay spread range, since the PRS can be received from potentially distant neighboring base stations for position estimation. The large delay spread range of the PRS can be achieved by covering the whole NR bandwidth and transmitting PRS over multiple symbols that can be aggregated to accumulate power. The density of subcarrier occupied in a given PRS symbol can be referred to as a comb size. There can be several configurable comb-based PRS patterns for comb-2, 4, 6, and 12 suitable for different scenarios serving different use cases. Each base station can transmit the reference signal in different sets of subcarriers to avoid interference.

In some examples, the plurality of downlink reference signals of the location assistance data 102 can include all reference signals the UE can use to perform the location related measurement. Some reference signals are currently being transmitted by base stations, and some other reference signals may not be currently transmitted, but can be potentially enabled for transmission at a late stage. Accordingly, at any time or location, the plurality of downlink reference signals of the location assistance data 102 includes a reference signal that can be used by UE 101 to perform the location related measurement. Base station 103a or 103b does not generate a reference signal that is not included in the plurality of downlink reference signals of the location assistance data 102 for UE 101 to perform the location related measurement. Since location assistance data 102 can include all the needed reference signals that UE 101 can use to perform the location related measurement, location assistance data 102 can be sent to UE 101 once and saved in UE 101 without being resent again, according to embodiments. As a result, the efficiency of location related measurements by UE 101 can be improved. Additionally, or alternatively, updates can be optionally sent.

According to some aspects, the information about the plurality of downlink reference signals can include an identifier associated with a downlink reference signal of the plurality of downlink reference signals, and a transmission configuration of the base station associated with the downlink reference signal. For example, Table 1 below shows information about the plurality of downlink reference signals of location assistance data 102. As shown, reference signal 1 can have an identifier 1, and can be transmitted by base station 1, e.g., base station 103a, using beam 123; while reference signal 3 can have an identifier 3, and can be transmitted by base station 1 antenna 1-1, e.g., base station 103a, using beam 122.

TABLE 1

| Reference signal | identifier | Transmission configuration | flags |
| --- | --- | --- | --- |
| Reference signal 1 | 1 | BS 1, beam 1 | Flag 1 |
| Reference signal 2 | 2 | BS 1, beam 2 | Flag 2 |
| Reference signal 3 | 3 | BS 1, beam 1-1 | Flag 3 |
| Reference signal 4 | 4 | BS 1, beam 1-2 | Flag 4 |

In addition, a reference signal of the plurality of downlink reference signals can include various flags to demonstrate operational characteristics of the reference signal. In some examples, reference signal 1 includes flag 1 to indicate whether reference signal 1 is currently being transmitted by base station 1 or not. Reference signal 2 includes flag 2 to indicate whether reference signal 2 can be dynamically triggered. Triggering a reference signal can include both starting and stopping transmissions of the reference signal. A reference signal can be further classified according how it can be dynamically triggered. Reference signal 3 includes flag 3 to indicate whether reference signal 3 can be dynamically triggered by the first location related protocol. Reference signal 4 includes flag 4 to indicate whether reference signal 4 can be dynamically triggered by a wireless access protocol. If a reference signal can be triggered by a wireless access protocol, an additional indicator or flag can be defined to distinguish whether the reference signal can be triggered by layer 1 (L1) signaling, or upper layer signaling, e.g., by radio resource control (RRC) signaling, medium access control-control element (MAC-CE) signaling. Various flags, e.g., flag 1, flag 2, flag 3, and flag 4 are shown as examples. Various embodiments can include a subset of flags. There can be additional flags or indicators can be defined, not shown.

According to some aspects, UE 101 can send a request 112 to base station 103a for a reference signal, where the reference signal is selected from the plurality of downlink reference signals of location assistance data 102. Request 112 can be sent by using a transceiver of UE 101 according to a wireless access protocol. The wireless access protocol can be a Fifth Generation (5G) protocol, a New Radio (NR) protocol, or a Long Term Evolution (LTE) protocol. UE 101 can send to base the request 112 to the base station 103a by RRC signaling, MAC-CE signaling, or L1 signaling.

According to some aspects, UE 101 can receive from base station 103a the requested reference signal, e.g., a reference signal 113. Base station 103a can be configured according to configuration 106 to send reference signal 113. Using the received reference signal 113, UE 101 can perform location related measurement 104. In some examples, the location related measurement 104 can include one or more of a received signal strength indication (RSSI), a round trip signal propagation time (RTT), a reference signal time difference (RSTD), a reference signal received power (RSRP), a reference signal received quality (RSRQ), an AOA, an AOD, or other location related measurements.

According to some aspects, UE 101 can report location related measurement 104 to network server 107 according to the first location related protocol 108. Network server 107 can determine the location of UE 101 based on location related measurement 104. Additionally and alternatively, UE 101 can determine the location of UE 101 based on location related measurement 104.

According to some aspects, additionally and alternatively, UE 101 can perform further operations. In some examples, UE 101 can select one or more reference signals from the plurality of downlink reference signals associated with location assistance data 102, and request the selected one or more reference signals from base station 103a. For example, UE 101 can request reference signal 3 or reference signal 4 from the set of reference signals shown in Table 1, because reference signal 3 and reference signal 4 are narrow beams that can provide more accuracy for location related measurements. UE 101 can send an indication of the selection of one or more reference signals directly to base station 103a according to a wireless protocol between base station 103a and UE 101. Additionally and alternatively, UE 101 can send an indication to network server 107 about the selected one or more reference signals. After receiving such indication, network server 107 can instruct base station 103 to send a reference signal from the selected one or more reference signals to UE 101, and UE 101 can receive the reference signal from the base station, where the received reference signal is among the selected one or more reference signals.

According to some aspects, UE 101 can be implemented according to a block diagram as illustrated in FIG. 2. UE 101 can have antenna panel 217 including one or more antenna elements to form various antenna beams, e.g., the beam 119, coupled to a transceiver 203 and controlled by a processor 209. In detail, transceiver 203 can include radio frequency (RF) circuitry 216, transmission circuitry 212, and reception circuitry 214. RF circuitry 216 can include multiple parallel RF chains for one or more of transmit or receive functions, each connected to one or more antenna elements of the antenna panel. In addition, processor 209 can be communicatively coupled to a memory device 201, which are further coupled to the transceiver 203. Various data can be stored in memory device 201. In some examples, memory device 201 can store the location assistance data 102 and the location related measurement 104, described above. Memory device 201 can include instructions, that when executed by the processor 209 perform the location related functions described herein. Alternatively, the processor 209 can be "hard-coded" to perform the location related functions described herein.

Figure 3:
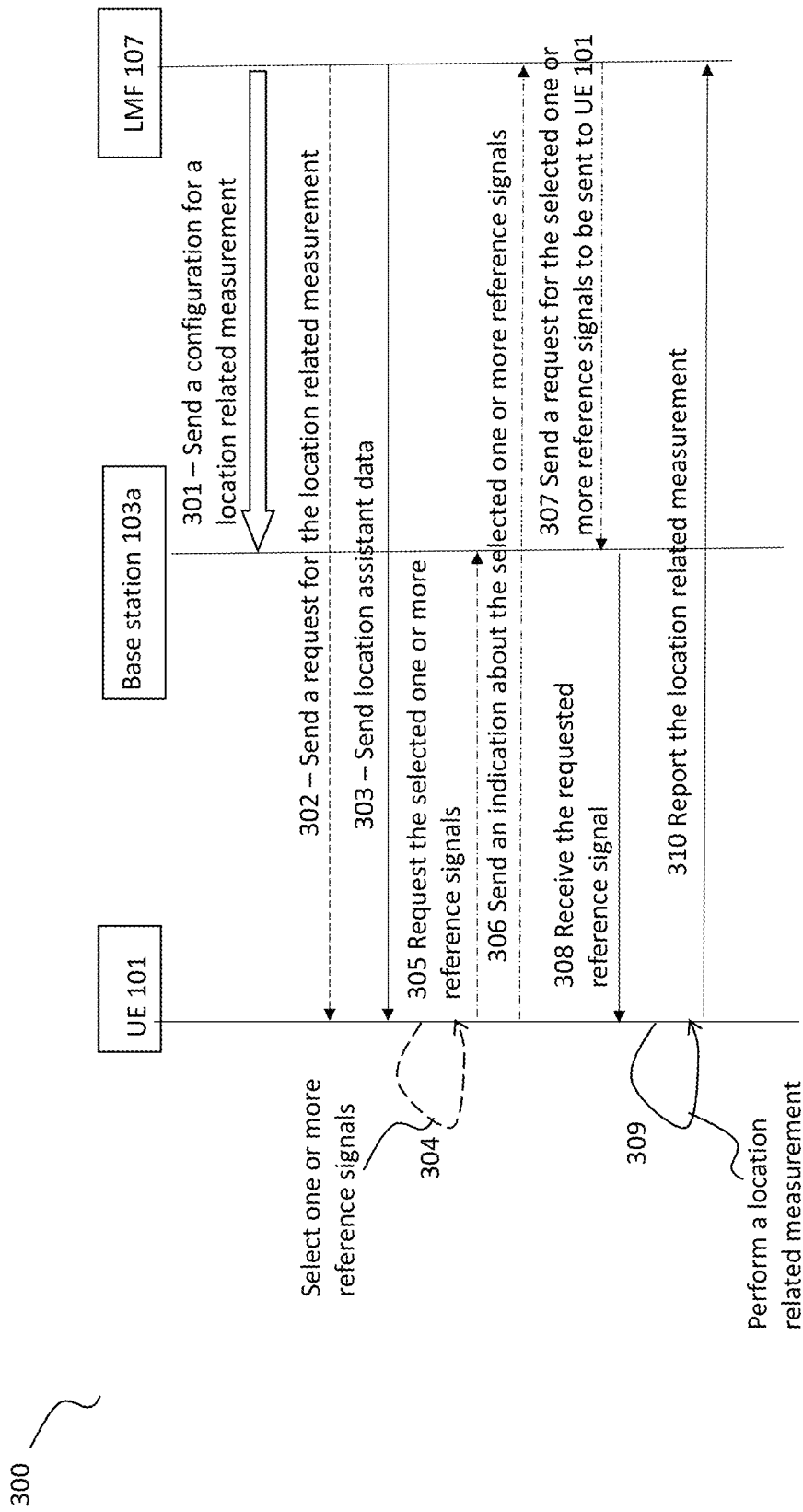
FIG. 3 illustrates an example sequence diagram illustrating operations performed by a UE, a base station, and a network server to provide on-demand reference signals for location related measurements of the UE, according to some aspects of the disclosure.

FIG. 3 illustrate an example sequence diagram 300 illustrating operations performed by UE 101, base station 103a, and network server 107 to provide on-demand reference signals for location related measurements of UE 101, according to some aspects of the disclosure. Operations performed by UE 101 can be performed or controlled by processor 209 in coordination with other components of UE 101. Processor 209 can be "hard-coded" to perform operations described below for UE 101, or processor 209 can execute instructions stored in memory 201 to perform the operations described below for UE 101.

At 301, network server 107 can send to base station 103a a configuration for location related measurement according to a location related protocol. The configuration can include a beam configuration for base station 103a, and can be shared by the base station and a neighboring base station. For example, network server 107 can send to base station 103a the configuration 106 for location related measurement according to the second location related protocol 109. In some examples, after receiving configuration 106, base station 103a can configure beam 123 and beam 125 based on some pre-configuration (i.e., pre-defined configuration) for reference signals, e.g., Table 1. In some embodiments, the configuration 106 can be the same configuration that is shared by multiple base stations, e.g., shared by base station 103a and base station 103b. In some examples, different configurations 106 and be sent to different base stations. In some examples, configuration 106 can be tailored to UE 101, so that different UEs 101 can have a different configurations 106. In some examples, base station 103a can configure only part of the beams, e.g., beam 123 and beam 125, for transmission to UE 101.

At 302, network server 107 can send to UE 101, according to a location related protocol, a request for the location related measurement to be performed by UE 101. For example, according to LPP, network server 107 can send to UE 101 a request for a location related measurement to be performed and provided by UE 101.

At 303, network server 107 can send to UE 101, according to a location related protocol, location assistance data. The location assistance data includes information about a plurality of downlink reference signals that can be used to perform location related measurements by the UE and provided by base station 103a. For example, network server 107 can send location assistance data 102 to UE 101 according to LPP. Location assistance data 102 can includes information about a plurality of downlink reference signal, e.g., information shown in Table 1.

At 304, UE 101 can select one or more reference signals from the plurality of downlink reference signals of the location assistance data. For example, UE 101 can decide to select reference signals with narrow beam configurations for more accuracy, e.g., reference signal 3 or reference signal 4 having a transmission configuration using beam 1-1 or beam 1-2, which is narrow beam 122 or narrow beam 124.

At 305, UE 101 can send a request to the base station for the selected one or more reference signals. For example, UE 101 can send, according to a wireless protocol of interface 111a to request reference signal 3 or reference signal 4 having a transmission configuration using beam 1-1 or beam 1-2, which is narrow beam 122 or narrow beam 124. In some examples, UE 101 can simply send a request to base station 103a for a reference signal without specifying which reference signal is to be sent. Base station 103a can select a reference signal and send the selected reference signal to UE 101. The wireless protocol can be one of a 5G protocol, a NR protocol, or a LTE protocol.

At 306, as an alternative, UE 101 can send an indication to network server 107 about the selected one or more reference signals. For example, UE 101 can send an indication to network server 107 to request reference signal 3 or reference signal 4 having a transmission configuration using beam 1-1 or beam 1-2, which is narrow beam 122 or narrow beam 124.

At 307, network server 107 can send a request or instructions to base station 103a for the selected reference signal to be sent to UE 101. For example, network server 107 can instruct base station 103a for reference signal 3 or reference signal 4 having a transmission configuration using beam 1-1 or beam 1-2, which is narrow beam 122 or narrow beam 124. In doing so, base station 103a can switch off the wide beam 123 and wide beam 125.

At 308, UE 101 can receive the requested reference signal from base station 103a. For example, UE 101 can receive reference signal 3 having the transmission configuration using beam 1-1, which is narrow beam 122.

At 309, UE 101 can perform a location related measurement based on the received reference signal. For example, UE 101 can measure the received reference signal for location related measurement 104, e.g, RSRP.

At 310, UE 101 can report the location related measurement to network server 107 according to the first location related protocol. For example, UE 101 can report location related measurement 104 to network server 107.

Figure 4:
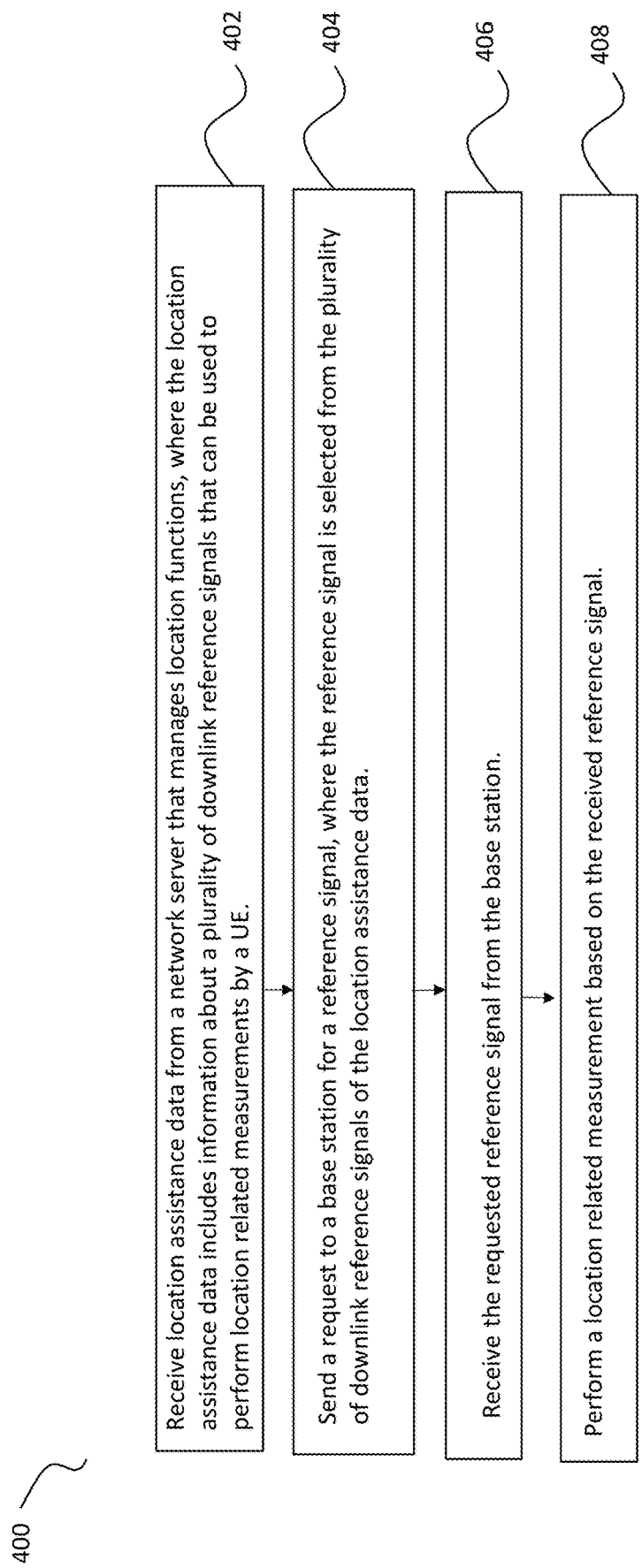
FIG. 4 illustrates an example method performed by a UE to perform location related measurements based on on-demand reference signals, according to some aspects of the disclosure.

FIG. 4 illustrates an example method 400 performed by a UE to perform location related measurements based on on-demand reference signals, according to some aspects of the disclosure. Method 400 can be performed by processor 209 of UE 101, alone, or by executing instructions stored in memory 201.

At 402, UE 101 can receive location assistance data from a network server that manages location functions, where the location assistance data includes information about a plurality of downlink reference signals that can be used to perform location related measurements by the UE. For example, UE 101 can receive location assistance data 102 from network server 107. In embodiments, location assistance data 102 is sent from network server 107, and goes through a base station, e.g., base station 103a, to reach UE 101. As will be understood based on discussions herein, any communications between network server 107 and UE 101 can be communicated through a base station that is serving the UE. When a base station performs routine functions in the communication between network server 107 and UE 101, the functions performed by the base station may not be explicitly stated.

At 404, UE 101 can send a request for a reference signal to a base station, where the reference signal is selected from the plurality of downlink reference signals of the location assistance data. For example, UE 101 can send request 112 to base station 103a for a reference signal, where the reference signal is selected from the plurality of downlink reference signals of location assistance data 102.

At 406, UE 101 can receive the requested reference signal from the base station. For example, UE 101 can receive from base station 103a the requested reference signal, e.g., reference signal 113.

At 408, UE 101 can perform a location related measurement based on the received reference signal. For example, UE 101 can perform a location related measurement 104 based on the received reference signal 113. In some examples, the location related measurement 104 can include one or more of a RSSI, a RTT, a RSTD, a RSRP, a RSRQ, an AOA, an AOD, or other location related measurements.

Figure 5:
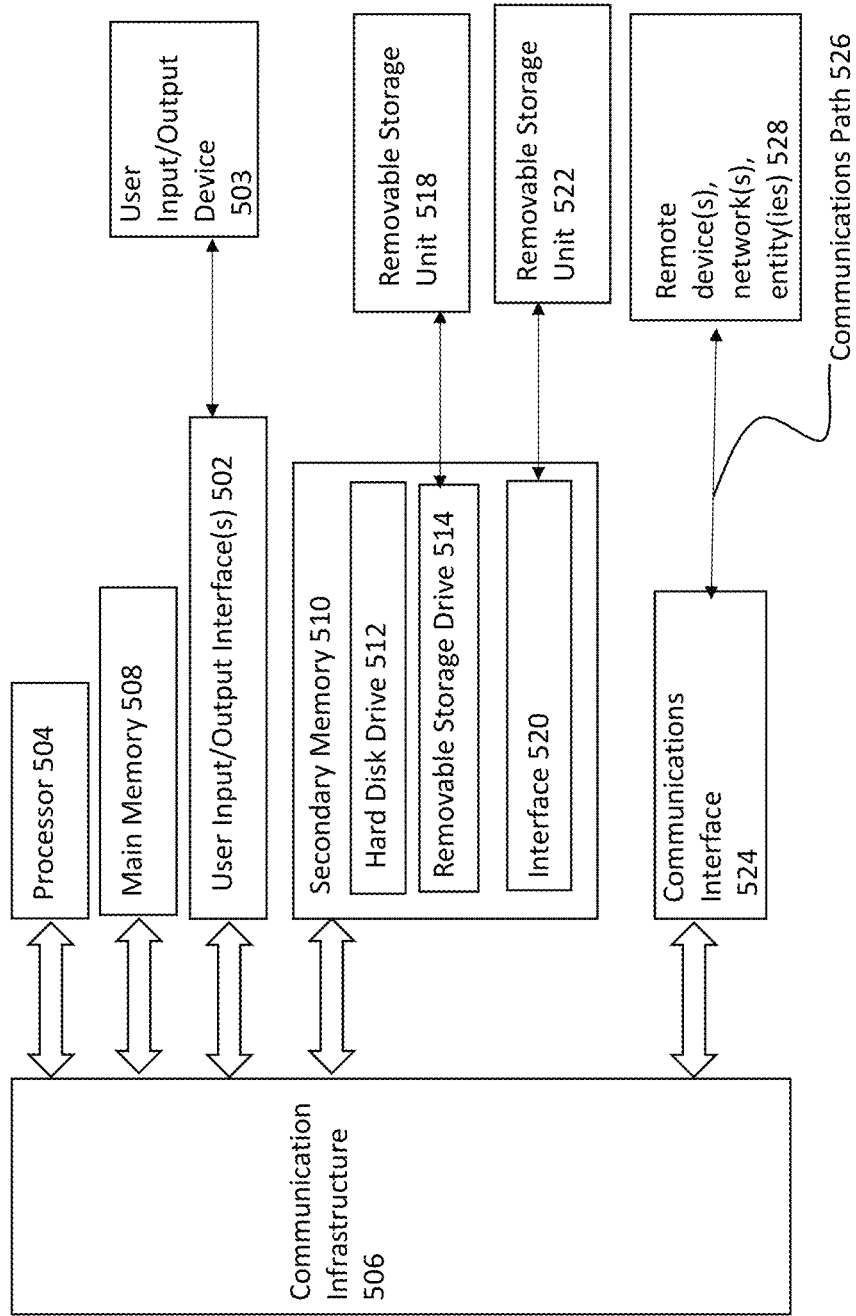
FIG. 5 is an example computer system for implementing some aspects or portion(s) thereof of the disclosure provided herein.

Various aspects can be implemented, for example, using one or more computer systems, such as computer system 500 shown in FIG. 5. Computer system 500 can be any computer capable of performing the operations described herein such as UE 101, base station 103a, or base station 103b as shown in FIGS. 1-2, and operations described in FIGS. 3-4. Computer system 500 includes one or more processors (also called central processing units, or CPUs), such as a processor 504. Processor 504 is connected to a communication infrastructure 506 (e.g., a bus). Computer system 500 also includes user input/output device(s) 503, such as monitors, keyboards, pointing devices, etc., that communicate with communication infrastructure 506 through user input/output interface(s) 502. Computer system 500 also includes a main or primary memory 508, such as random access memory (RAM). Main memory 508 may include one or more levels of cache. Main memory 508 has stored therein control logic (e.g., computer software) and/or data.

Computer system 500 may also include one or more secondary storage devices or memory 510. Secondary memory 510 may include, for example, a hard disk drive 512 and/or a removable storage device or drive 514. Removable storage drive 514 may be a floppy disk drive, a magnetic tape drive, a compact disk drive, an optical storage device, tape backup device, and/or any other storage device/drive.

Removable storage drive 514 may interact with a removable storage unit 518. Removable storage unit 518 includes a computer usable or readable storage device having stored thereon computer software (control logic) and/or data. Removable storage unit 518 may be a floppy disk, magnetic tape, compact disk, DVD, optical storage disk, and/any other computer data storage device. Removable storage drive 514 reads from and/or writes to removable storage unit 518 in a well-known manner.

According to some aspects, secondary memory 510 may include other means, instrumentalities or other approaches for allowing computer programs and/or other instructions and/or data to be accessed by computer system 500. Such means, instrumentalities or other approaches may include, for example, a removable storage unit 522 and an interface 520. Examples of the removable storage unit 522 and the interface 520 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

In some examples, main memory 508, the removable storage unit 518, the removable storage unit 522 can store instructions that, when executed by processor 504, cause processor 504 to perform operations for a UE or a base station, e.g., UE 101, base station 103a, or base station 103b as shown in FIGS. 1-2, and operations described in FIGS. 3-4.

Computer system 500 may further include a communication or network interface 524. Communication interface 524 enables computer system 500 to communicate and interact with any combination of remote devices, remote networks, remote entities, etc. (individually and collectively referenced by reference number 528). For example, communication interface 524 may allow computer system 500 to communicate with remote devices 528 over communications path 526, which may be wired and/or wireless, and which may include any combination of LANs, WANs, the Internet, etc. Control logic and/or data may be transmitted to and from computer system 500 via communication path 526. Operations of the communication interface 524 can be performed by a wireless controller, and/or a cellular controller. The cellular controller can be a separate controller to manage communications according to a different wireless communication technology. The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 500, main memory 508, secondary memory 510 and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 5. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

For one or more embodiments or examples, at least one of the components set forth in one or more of the preceding figures may be configured to perform one or more operations, techniques, processes, and/or methods as set forth in the example section below. For example, circuitry associated with a thread device, routers, network element, etc. as described above in connection with one or more of the preceding figures may be configured to operate in accordance with one or more of the examples set forth below in the example section.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A user equipment (UE), comprising:
 a transceiver configured to enable wireless communication with a base station; and
 a processor communicatively coupled to the transceiver and configured to:
  receive, according to a first location related protocol, location assistance data from a network server that manages location functions, wherein the location assistance data includes information about a plurality of downlink reference signals that can be used to perform location related measurements by the UE;
  send, using the transceiver, a request for a reference signal from the base station, wherein the reference signal is selected from the plurality of downlink reference signals in the location assistance data;
  receive the requested reference signal from the base station; and
  perform a location related measurement based on the received reference signal,
  wherein the first location related protocol is different from a second location related protocol that is used by the network server to configure the base station.

2. The UE of claim 1, wherein to send the request for the reference signal, the processor is configured to:
 send the request for the reference signal according to the first location related protocol to the network server, or according to a wireless access protocol to the base station.

3. The UE of claim 1, wherein the processor is further configured to:
 receive from the network server, according to the first location related protocol, a request for the location related measurement to be provided by the UE.

4. The UE of claim 1, wherein the processor is further configured to:
 report the location related measurement to the network server according to the first location related protocol.

5. The UE of claim 1, wherein to send the request for the reference signal, the processor is configured to:
 select one or more reference signals from the plurality of downlink reference signals based on the information in the location assistance data; and
 request the selected one or more reference signals from the base station.

6. The UE of claim 1, wherein the reference signal is a first reference signal, and the processor is further configured to send a second request to the base station to not send a second reference signal from the base station for the location related measurement, wherein the second reference signal is selected from the plurality of downlink reference signals of the location assistance data.

7. The UE of claim 1, wherein the processor is further configured to:
 select one or more reference signals from the plurality of downlink reference signals based on the information in the location assistance data;
 send an indication to the network server about the selected one or more reference signals; and
 receive the reference signal from the base station, wherein the received reference signal is among the selected one or more reference signals.

8. The UE of claim 1, wherein the reference signal comprises a positioning reference signal (PRS),
 the first location related protocol between the UE and the network server is a Long Term Evolution (LTE) positioning protocol (LPP), and
 the second location related protocol between the network server and the base station is a new radio positioning protocol A (NRPPa) or an LTE positioning protocol A (LPPa).

9. The UE of claim 1, wherein the location related measurement includes one or more of a received signal strength indication (RSSI), a round trip signal propagation time (RTT), a reference signal time difference (RSTD), a reference signal received power (RSRP), a reference signal received quality (RSRQ), an angle of arrival (AOA), or an angle of departure (AOD).

10. The UE of claim 1, wherein the location assistance data includes assistance data to support one or more of position procedures including: Observed Time Difference Of Arrival (OTDOA), Downlink time difference of arrival (DL-TDOA), Downlink angle-of-departure (DL-AoD), multi-cell round trip time (multi-RTT), Assisted Global Navigation Satellite System (A-GNSS), Real Time Kinematics (RTK), Precise Point Positioning (PPP), or Differential GNSS (DGNSS).

11. The UE of claim 1, wherein the information about the plurality of downlink reference signals includes a first flag to indicate whether a reference signal of the plurality of downlink reference signals is currently being transmitted by the base station, a second flag to indicate whether the reference signal can be dynamically triggered, a third flag to indicate whether the reference signal can be dynamically triggered by the first location related protocol, or a fourth flag to indicate whether the reference signal can be dynamically triggered by a wireless access protocol.

12. The UE of claim 1, wherein the information about the plurality of downlink reference signals of the location assistance data includes an identifier associated with a downlink reference signal of the plurality of downlink reference signals, and a transmission configuration of the base station associated with the downlink reference signal.

13. A non-transitory computer-readable medium storing instructions that, when executed by a processor of a user equipment (UE), cause the UE to perform operations, the operations comprising:
- receiving, according to a first location related protocol, location assistance data from a network server that manages location functions, wherein the location assistance data includes information about a plurality of downlink reference signals that can be used to perform location related measurements by the UE;
- sending a request for a reference signal from a base station, wherein the reference signal is selected from the plurality of downlink reference signals in the location assistance data;
- receiving the requested reference signal from the base station;
- performing a location related measurement based on the received reference signal; and
- reporting the location related measurement to the network server according to the first location related protocol,
- wherein the first location related protocol is different from a second location related protocol that is used by the network server to configure the base station.

14. The non-transitory computer-readable medium of claim 13, wherein the request for the reference signal is sent according to a wireless access protocol selected from a Fifth Generation (5G) protocol, a New Radio (NR) protocol, or a Long Term Evolution (LTE) protocol;
- wherein the location related measurement includes one or more of a received signal strength indication (RSSI), round trip signal propagation time (RTT), reference signal time difference (RSTD), reference signal received power (RSRP), reference signal received quality (RSRQ), angle of arrival (AOA), or angle of departure (AOD),
- wherein the first location related protocol between the UE and the network server is an LTE positioning protocol (LPP) or an LTE positioning protocol A (LPPa), and
- the second location related protocol between the network server and the base station is a new radio positioning protocol (NRPP) or a new radio positioning protocol A (NRPPa).

* * * * *